No. 751,890. PATENTED FEB. 9, 1904.
F. R. WILLSON, Jr.
CONVEYER LOADING DEVICE.
APPLICATION FILED NOV. 23, 1901. RENEWED DEC. 17, 1903.
NO MODEL. 5 SHEETS—SHEET 3.

WITNESSES.
C. N. Woodward.
A. K. Williams Jr.

FREEMAN R. WILLSON, JR. INVENTOR.
By N. H. Bliss ATTORNEY.

No. 751,890. PATENTED FEB. 9, 1904.
F. R. WILLSON, Jr.
CONVEYER LOADING DEVICE.
APPLICATION FILED NOV. 23, 1901. RENEWED DEC. 17, 1903.
NO MODEL. 5 SHEETS—SHEET 4.

WITNESSES.
FREEMAN R. WILLSON, JR
INVENTOR.
ATTORNEY.

No. 751,890. PATENTED FEB. 9, 1904.
F. R. WILLSON, Jr.
CONVEYER LOADING DEVICE.
APPLICATION FILED NOV. 23, 1901. RENEWED DEC. 17, 1903.
NO MODEL. 5 SHEETS—SHEET 5.
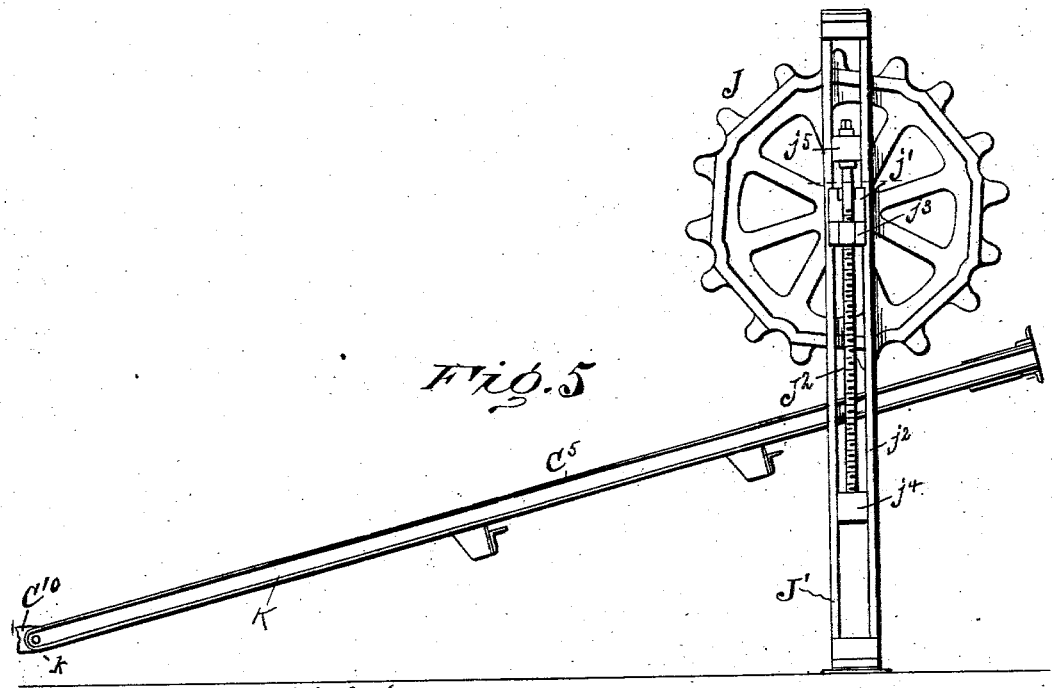
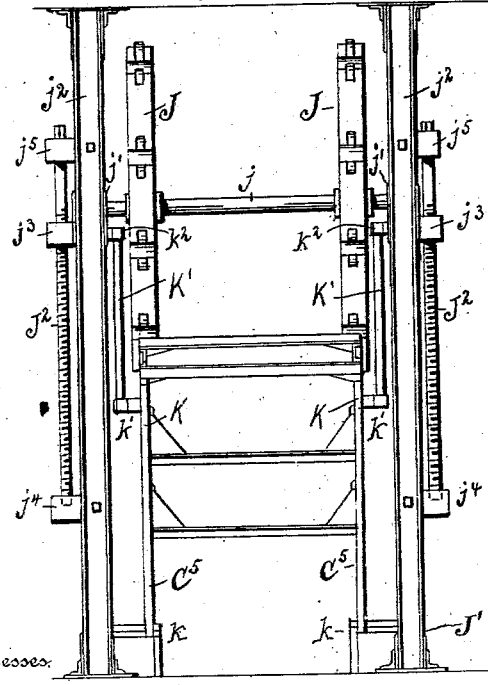
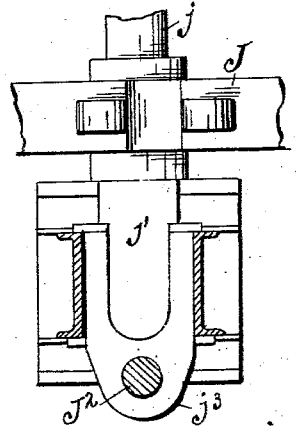
FREEMAN R. WILLSON Jr. Inventor
By H. H. Bliss
Attorney
Witnesses
C. N. Woodward
A. K. Williams Jr.

No. 751,890. Patented February 9, 1904.

UNITED STATES PATENT OFFICE.

FREEMAN R. WILLSON, JR., OF COLUMBUS, OHIO, ASSIGNOR TO JOSEPH A. JEFFREY, OF COLUMBUS, OHIO.

CONVEYER-LOADING DEVICE.

SPECIFICATION forming part of Letters Patent No. 751,890, dated February 9, 1904.

Application filed November 23, 1901. Renewed December 17, 1903. Serial No. 185,592. (No model.)

*To all whom it may concern:*

Be it known that I, FREEMAN R. WILLSON, Jr., a citizen of the United States, residing at Columbus, in the county of Franklin and State of Ohio, have invented certain new and useful Improvements in Conveyer-Loading Devices, of which the following is a specification, reference being had therein to the accompanying drawings.

Figure 1:
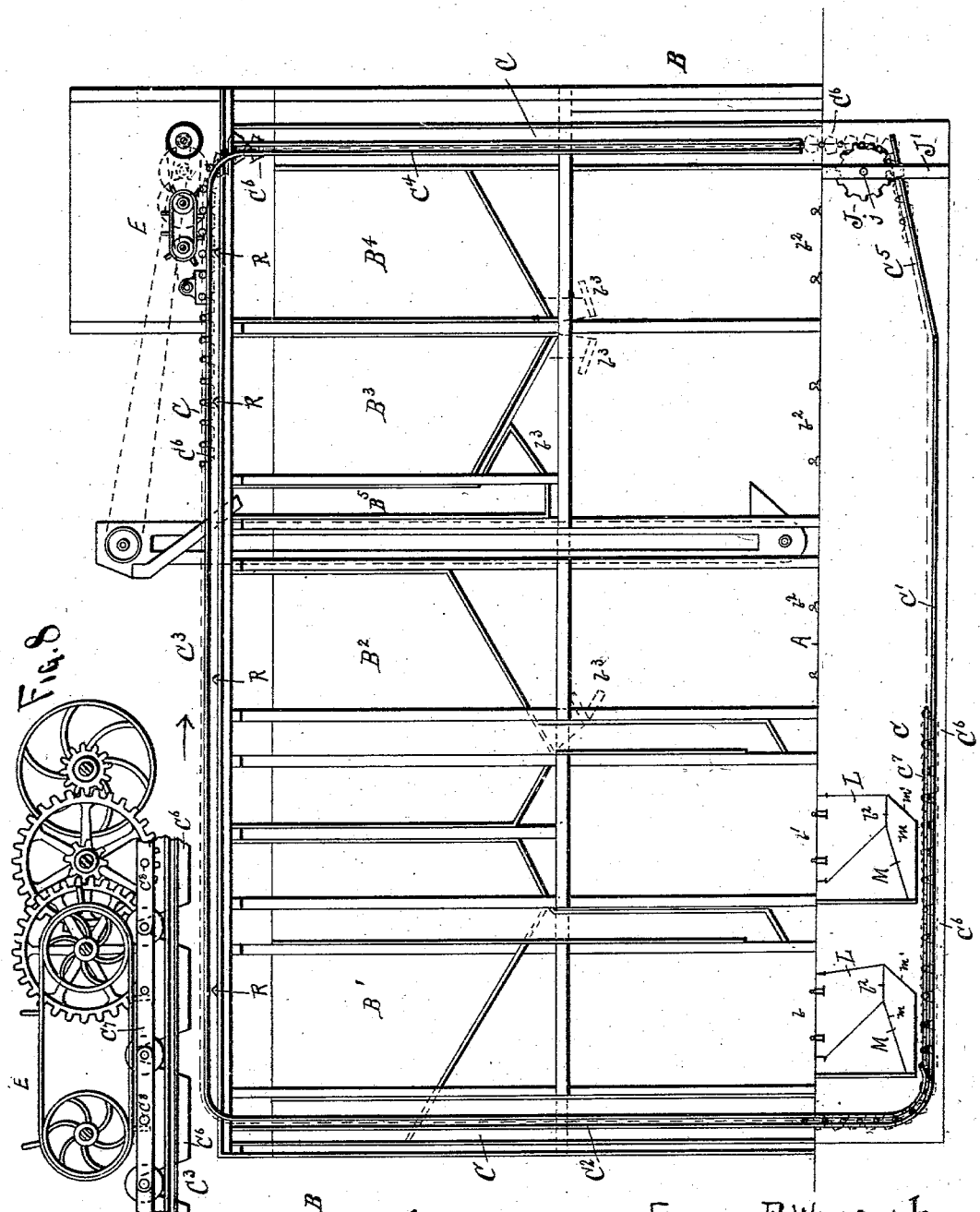
Figure 2:
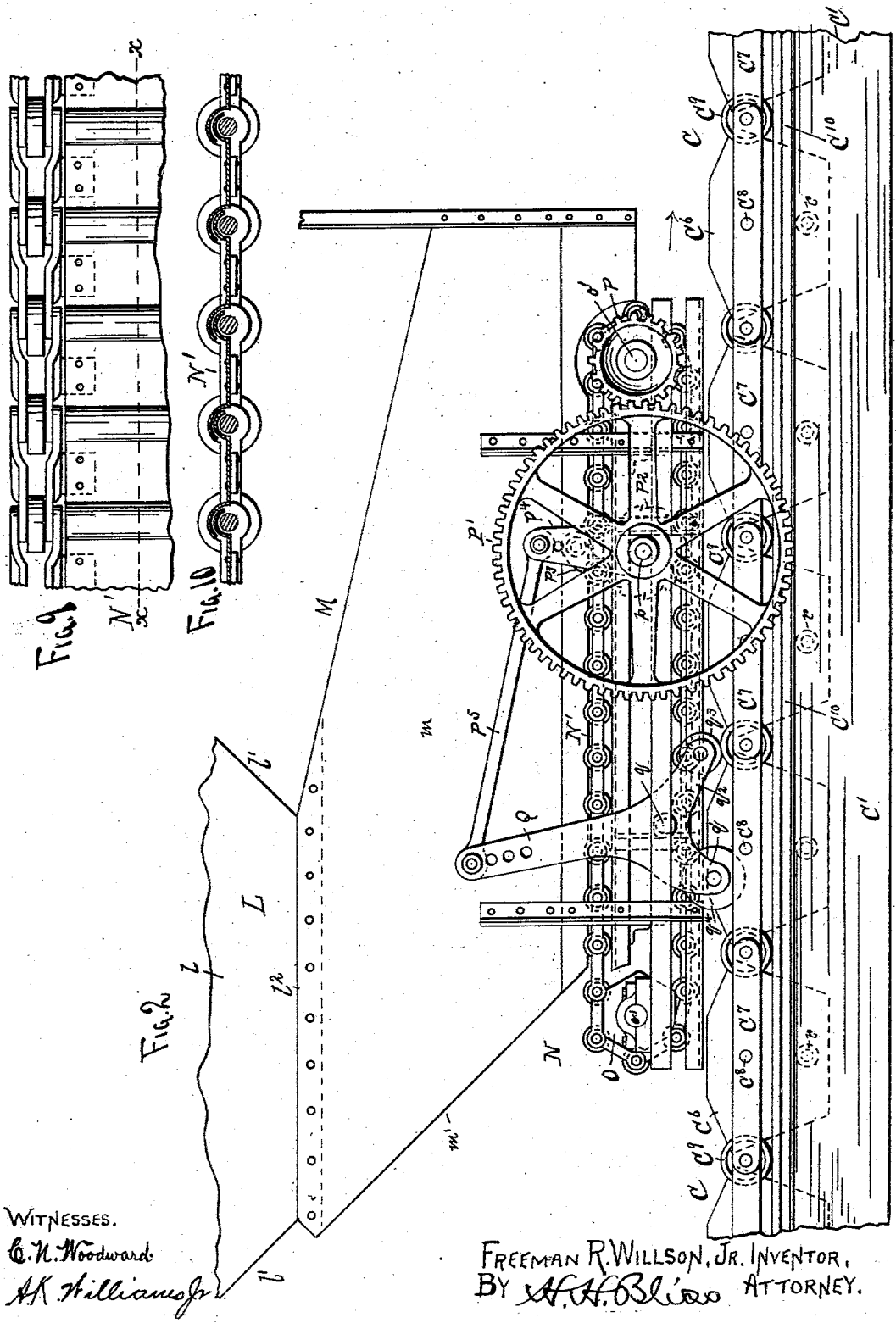
Figure 3:
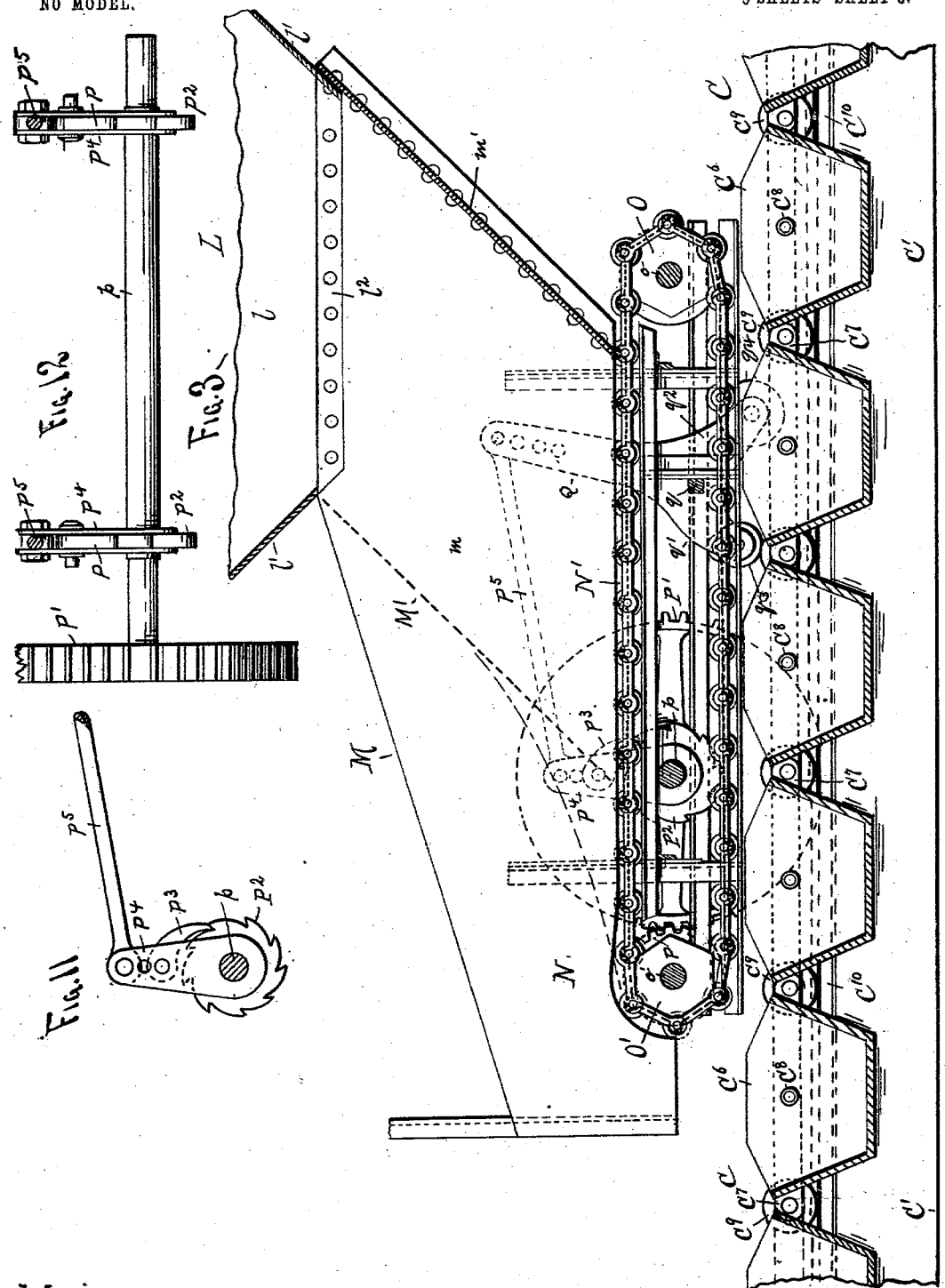
Figure 4:
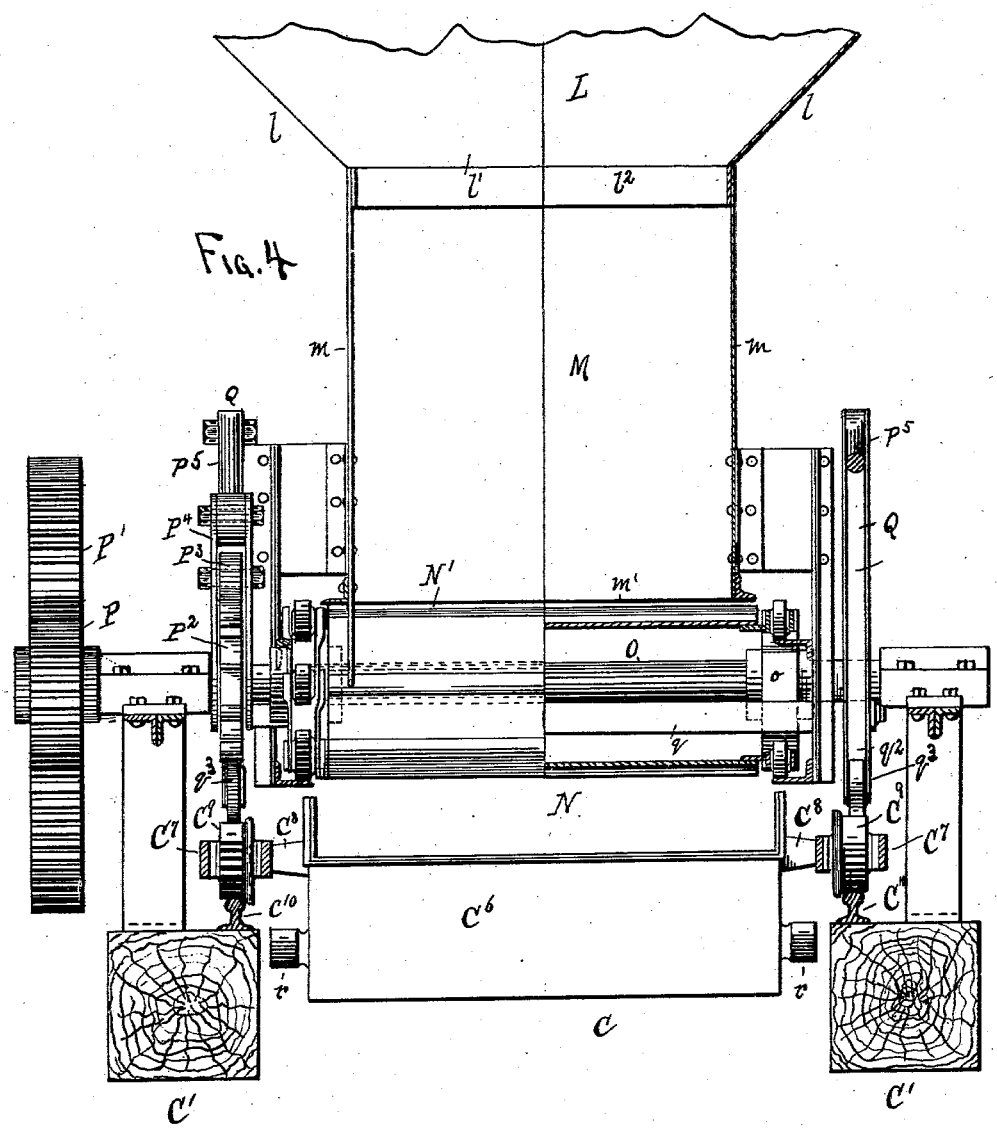

Figure 1 is a diagrammatic side elevation illustrating the general features of a conveyer apparatus embodying my improvements. Fig. 2 is a side elevation of the bucket-loading devices. Fig. 3 is a longitudinal section of the bucket-loader and of part of the conveyer. Fig. 4 is a view, partly in front elevation and partly in section, of the bucket-loader. Fig. 5 is a side elevation of the part which guides the conveyer at the place where the slack is regulated. Fig. 6 is a front view of the parts in Fig. 5. Fig. 7 is a top view of an adjusting device at one side of the wheel. Fig. 8 is an enlarged detail view of the conveyer-actuating mechanism. Fig. 9 is an enlarged plan view of part of the feed-apron. Fig. 10 is a sectional view on the line $x$ $x$ of Fig. 9. Fig. 11 is an elevation of the ratchet mechanism detached. Fig. 12 shows in front elevation the driving-shaft for the feeder.

To illustrate one method of employing an apparatus containing my improvements, I have selected a locomotive-coaling station and in Fig. 1 have shown it conventionally and have also shown a conveyer in connection therewith. Referring to that figure, A indicates the general plane of the surface of the ground, and from it there rises upward the structure, (indicated as a whole by B,) while below this line there is sunk a pit to contain parts of the conveying apparatus and the loaders therefor.

The structure B in its upper part supports a series of coal-bins $B'$ $B^2$ $B^3$ $B^4$ and a sand-bin $B^5$. Railway-tracks are shown at $b$ $b'$ $b^2$, those at $b$ $b'$ being illustrated as adapted to bring to the conveyer and elevator the coal or sand which it is desired to elevate and store in the aforesaid bins and those at $b^2$ being shown as adapted for locomotives which are to receive their charges of coal or sand from the said bins, there being spouts or movable chutes at $b^3$ for this purpose.

The conveyer is indicated by C, the parts thereof to be referred to more specifically below. It is arranged to travel on a lower horizontal run $C'$, a vertical run $C^2$, an upper horizontal run $C^3$, and a down vertical run $C^4$, there being at $C^5$ a section of the conveyer and of its support which is adapted to be adjusted to provide for regulating the tension of this mechanism for taking up slack, &c.

The conveyer proper comprises a series of buckets $C^6$ $C^6$, supporting-chains $C^7$ at the sides, hinges $C^8$, which unite the buckets to the chains, and antifriction-rollers $C^9$, which are mounted at the sides of the chain-links and are fitted to the tracks or rails $C^{10}$. The wheels $C^9$ support the conveyer upon the track.

The conveyer at no point rests upon drive-wheels, the only wheels with which it or its chains come in contact being the wheels at the tension take-up device to be described. At the two upper and one of the lower corners of the rectangular path around which the conveyer moves the track-rails are merely curved and the downward stress and weight of the conveyer are at all points taken by these track-rails.

Motion is imparted to the conveyer by means of an endless driving device, (indicated by E,) it comprising chains and a sprocket driving mechanism, together with arms or projections which engage with the main conveyer and impart motion to the latter.

The take-up device, which is applied to that part of the conveyer indicated by $C^5$, as aforesaid, is constructed as follows: J J are two guiding sprocket-wheels connected to shaft $j$ and situated at the place where the conveyer turns from the down run to the lower horizontal run. This shaft $j$ is mounted in vertically-adjustable boxes $j'$, which are mounted in guideways at $j^2$ in the frame-pillars $J'$. These boxes can be raised or lowered by means of the screw-rods $J^2$, each of which engages with the nut $j^3$, carried by a box $j'$, and is mounted in a bottom bearing-piece $j^4$ and a top bearing $j^5$. By means of a wrench either or both boxes and the sprocket-wheels J J therewith can be let down or raised, as desired.

K K indicate vertically-adjustable track-sections. They are hinged at $k$, so as to aline properly with the main track-sections $C^{10}$. The upper ends of these track-bars K are supported by links K', which are connected to the track-rails by trunnions at $k'$, and at their upper ends are connected by trunnions $k^2$ with the vertical adjustable boxes $j'$. When the sprocket-wheels J J are raised or lowered, the track-sections K K will be correspondingly adjusted. The descending part of the conveyer can be guided gradually and easily to the track-rails K and $C^{10}$, and the jars and pounding generally incident to conveyers of this class when the slack or looseness is uncontrolled are obviated.

At L is located the initial hopper, which receives the coal or other material in the first instance and which is to be loaded to the conveyer above described.

M is an intermediate guide or chute between the hopper and the conveyer.

N indicates as an entirety the apparatus for controlling the delivery of the material from the chute M to the buckets.

As shown, the hopper L has the side walls $l\ l$ and the end walls $l'$, these preferably converging to guide the material to a reduced area of escape at $l^2$. The chute or guide M has the side walls $m\ m$ and the back wall $m'$.

The material coming downward from the hopper L into the guide or chute M is checked by the horizontal wall-like part of the controlling device, (indicated as a whole by N,) and as it thus descends under the influence of gravity and the pressure from the upper part of the mass it seeks, reaches, and stops at a plane indicated by the line M'.

Various devices have been used or proposed for controlling the passage of such a mass of material, including a short endless series of hoppers carried by chains and successively registering with the buckets below, also rotary measuring-cylinders divided into compartments, and also reciprocating floors or valves. Having had experience with each of a number of such devices, I have found serious disadvantages to be incident to them. The loading mechanism having the reciprocating valve or plate has been the least disadvantageous of these devices, but nevertheless there are disadvantages incident to it, and particularly this, that it requires twice the power to move it that I have found to be necessary if a mechanism such as that herein be employed. The entire weight of the mass of material in the hopper and in the chute or guide rests upon the valve or plate, and if it is reciprocated it is necessary to first drag it back under the load of the said superincumbent weight and then push it forward again under the same, it being resisted in both directions by the friction of the material which rests upon it, and even when the valve is supported upon rollers or wheels it still has this friction of the superincumbent mass to overcome. This trouble I have obviated by substituting a flat floor-like carrier adapted to move continuously in one direction, though moving step by step, the essential parts of which I will describe.

N' indicates an apron-carrier formed of chains and sheets of flight or plate material secured to the tops of the chains and extending from one to the other, so as to make a tight imperforate floor. This carrier is mounted upon the wheels O O, on the shaft $o$ in the rear of the wall $m'$, and upon the wheels O' O' on the shaft $o'$, situated in a transverse plane somewhat forward of the above-described line M', which indicates the inclined plane at which the material naturally comes to rest. When the parts are thus arranged, the apron serves at all times as a complete cut-off for the material (so far as concerns its tendency to be crowded or forced downward by the weight of the mass in the hopper) and at the same time is ready to deliver a small amount of the material resting upon it to each of the buckets passing below it. For this latter purpose the carrier is moved as follows: P is a gear-wheel on the shaft $o'$, which meshes with a gear-wheel P' on a shaft $p$, mounted transversely of the conveyer. To the shaft-wheel P' is connected a ratchet-wheel $P^2$, which receives motion from a pawl $P^3$, carried by the vibratable arm $P^4$. The arm $P^4$ is connected by a link or pitman $P^5$ with a vibrating lever Q. This lever is pivoted on a horizontal axis at $q$. It has two arms $q'\ q^2$, the former provided with a roller $q^4$ and the latter with a roller $q^3$. The arms or their rollers are so arranged as to lie and be vibratable in the vertical planes of the rollers $C^9$. Each roller of the conveyer as it approaches the lever first strikes against the roller $q^4$ on arm $q'$ and subsequently impinges on the roller $q^3$ on arm $q^2$. The arms $q'\ q^2$ extend out from the axis $q$ in such way that the conveyer-rollers $C^9$ successively throw the upper end of the lever Q to the left and then to the right. Its movement to the right in Fig. 3 compels the pawl $P^3$ to turn the wheel $P^2$, and with it the wheels P' and P, in such way as to advance the upper part of the conveyer end a step, which movement carries forward enough of the material from the hopper and chute to constitute a bucket-load, and the same is dropped into the bucket, which has reached the proper position to receive it.

In order to prevent torsion and lateral strains or twistings of the conveyer carrying the buckets or of the loading-carrier or of the parts which actuate the latter, I prefer to employ a duplicate set of driving parts, one upon the right-hand side of the conveyer and the other upon the left, each set comprising a lever Q and a ratchet and pawl connected to the shaft $p$, this resulting in a balancing of the strains and in an application of the power with the greatest economy.

It will be seen that there is no backward motion of any of the parts upon which rests the load of material, there being, on the contrary, only step-by-step advance movements of the carrier, and as there is a tendency for this load to naturally crowd forward the movement of the carrier is accomplished with little if any rubbing or dragging of the conveyer-surface under the mass. At the same time it will be seen that that part of the material which is in advance of the aforesaid line M' has no tendency to crowd or squeeze forward, the force which causes such crowding being lost at the line M', and consequently when the conveyer ceases in its movement there is no material tendency of the material to spill over the front end of the carrier.

The quantity of material to be fed can be regulated by either of several adjustments that can be introduced, I having found it sufficient for all ordinary circumstances to merely provide a series of apertures in the upper arms of the levers $P^4$ and Q, which permit the attachment of the pitman or link $P^5$ at different radial distances, so as to vary the throw of the pawl $P^3$ and the number of teeth in the ratchet-wheel over which it passes backward for its successive engagement.

The loaded buckets travel along the path of the conveyer until they reach the upper run, and as they move along the latter they are automatically emptied successively into one or another of the bins B' $B^2$, &c. The tilting of the buckets to empty them may be accomplished in any preferred manner—as, for instance, by means of lugs R, with antifriction-rollers $r$ on the ends of the buckets, adapted to engage with suitable cams, tracks, or the like capable of adjustment to and from the path of said lugs, one of the tripping devices being properly arranged directly above each of the bins or hoppers.

What I claim is—

1. The combination with the hopper or chute, and the series of conveyer buckets or receptacles of the endless carrier interposed between the buckets and the chute and arranged to have its plates form a cut-off floor for the chute upon which rests the material therein, and means actuated by the bucket conveyer for imparting a step-by-step movement to said carrier, its said movements being continuously in one direction, substantially as set forth.

2. The combination with the hopper or chute, and the series of conveyer buckets or receptacles, of the endless carrier between the chute and the buckets and arranged to have its plates form a cut-off floor for the chute upon which rests the material therein, said cut-off floor of the carrier constituting the upper "run" thereof, and means for advancing the upper run of said carrier with step-by-step movement in the direction of travel of the buckets which receive the material therefrom, substantially as set forth.

3. The combination with the hopper or chute, and the series of conveyer buckets or receptacles, of the endless carrier constructed with a tight or continuous carrying-floor upon which rests the material in the chute and having a forward traveling part and a rearward traveling part, both below the chute, and means for imparting a step-by-step movement to the said carrier, substantially as set forth.

4. The combination with the hopper or chute and the series of conveyer buckets or receptacles below the chute, of the endless carrier having both its advancing and returning portions between the buckets and the material in the chute and arranged to have its end in advance of the transverse line to which the material in the chute or hopper normally advances under the pressure of gravity from the material in the hopper or chute, and means for imparting a step-by-step movement to said carrier corresponding to the advances of the buckets or receptacles of said conveyer, substantially as set forth.

5. The combination with the hopper or chute and the series of conveyer buckets or receptacles, of an endless sectional cut-off floor for the chute above the buckets arranged to directly sustain at all times the main mass of material in the hopper or chute, and means for intermittingly advancing the said sectional floor and causing it to deliver small portions of the said material to the said buckets successively, substantially as set forth.

6. The combination with the hopper or chute and the series of conveyer buckets or receptacles, of the endless sectional floor for the chute upon which rests the material therein and extending from a transverse vertical plane in rear to a transverse vertical plane in front of those transverse lines which are at the rear and at the front of the space covered by the bottom of the mass of material in the hopper or chute when it is normally at rest, and means for advancing the said endless sectional floor by movements which are continuously in one direction, substantially as set forth.

7. The combination with the hopper or chute, and the series of conveyer buckets or receptacles, of the endless sectional floor for the chute upon which rests the material therein and situated above the buckets and extending from a transverse vertical plane in rear of the rear wall $m'$ of the chute or hopper to a transverse vertical plane in front of the lower end of the line M' to which the material normally comes at rest under the pressure of gravity of the superincumbent mass, and means for advancing the said endless sectional floor with movements which are continuously in one direction, substantially as set forth.

8. The combination with the endless conveyer of the take-up device consisting of the vertically-adjustable sprocket-wheel and the vertically-adjustable track-sections adjacent to the said sprocket-wheels, substantially as set forth.

9. The combination with the track or guideway having an upper horizontal section, the vertical end section, the lower horizontal section and the vertically-adjustable section at the bottom, of the endless conveyer fitted to and traveling on the said track, substantially as set forth.

10. The combination with the endless conveyer having the upper horizontal "run," the vertical legs where the conveyer travels upward and downward respectively, and the lower horizontal "run" of the guideway or track for the said conveyer having all of its parts stationary at the upper ends of the conveyer-legs and along its upper run, and having the adjustable or take-up section adjacent to the lower run of the conveyer, substantially as set forth.

11. The combination with the receptacle adapted to contain the material to be fed and the receiving-conveyer, of a feeding or delivering conveyer arranged to have its plates form a cut-off floor for the receptacle to limit the flow of material therefrom, and means actuated by the receiving-conveyer for causing the feeder-conveyer to intermittently deliver a predetermined quantity of material to it, substantially as set forth.

12. The combination with the hopper or receptacle adapted to contain the material to be fed, and the receiving-conveyer, of a feeding or delivering conveyer arranged to have its plates form a cut-off floor for the hopper to limit the flow of material therefrom, means for actuating the feeding-conveyer intermittently and always in one direction, and means for varying the quantity of material in the charges which it delivers to the receiving-conveyer, substantially as set forth.

13. The combination with the hopper or chute and the receiving-conveyer, of a feeding-conveyer arranged to have its plates form a cut-off floor for the hopper to limit the flow of material therefrom, means for imparting a step-by-step movement to the said feeding-conveyer and means for varying the travel of said feeding-conveyer during each step-by-step movement thereof, whereby the quantity of material delivered to the receiving-conveyer in each charge may be regulated, substantially as set forth.

14. The combination with the hopper or chute, and the receiving-conveyer, of a feeding or delivering conveyer interposed between the hopper and the receiving-conveyer and having its sections arranged to form a cut-off floor for the hopper to limit the flow of material therefrom, means actuated by the receiving-conveyer for imparting a step-by-step movement to the said feeding-conveyer and means for varying the distance of travel of the feeding-conveyer during its step-by-step movements, whereby the quantity of material which it delivers to the receiving-conveyer in each charge may be varied, substantially as set forth.

15. In a conveyer-loading device, the combination with the hopper or chute and the conveyer buckets or receptacles to be loaded, and arranged to travel always in one direction, of a feeding-conveyer interposed between said hopper and conveyer-buckets having its sections arranged to form a cut-off floor for the hopper to limit the flow of material therefrom, and means for actuating the feeder-conveyer so that its sections, which, at a given time form the cut-off floor for the hopper, travel in a direction opposite to the direction of travel of said conveyer-buckets, substantially as set forth.

16. In a conveyer-loading device the combination with the hopper, and the series of buckets or receptacles adapted to receive material therefrom and arranged to travel always in one direction, of an endless feeder-conveyer interposed between the hopper and the bucket conveyer and arranged to have the sections of its upper flight form a cut-off floor for the hopper to limit the flow of material therefrom and means for actuating the feeder-conveyer so that its upper flight travels always in a direction opposite to the direction of travel of the receiving-conveyer, substantially as set forth.

17. In a conveyer-loading device, the combination with the hopper or chute and the series of conveyer buckets or receptacles, of the endless feeder interposed between the buckets and the chute and arranged to have the sections of its upper flight form a cut-off floor for the chute to limit the flow of material therefrom, and means for imparting a step-by-step movement to the feeder and for causing the sections in its upper flight to travel in a direction opposite to the direction of travel of the conveyer-buckets, substantially as set forth.

18. In a conveyer-loading device, the combination with the hopper or chute and the series of conveyer buckets or receptacles, of the endless feeder-conveyer interposed between the conveyer-buckets and the chute and arranged to have the sections of its upper flight form a cut-off floor for the chute to limit the flow of material therefrom and means actuated by the bucket conveyer for imparting a step-by-step movement to the feeder-conveyer and for causing the sections of its upper flight to travel in a direction opposite to the direction of travel of the conveyer-buckets, substantially as set forth.

In testimony whereof I affix my signature in presence of two witnesses.

FREEMAN R. WILLSON, JR.

Witnesses:
A. D. DONHAM,
CHAS. M. SNIDER.